United States Patent [19]

Holzwarth et al.

[11] 4,271,887
[45] Jun. 9, 1981

[54] TIRE CHAIN

[76] Inventors: Dietmar H. Holzwarth, Vogelhofstr. 51, 7070 Schwäbisch Gmünd; Hansjörg W. Rieger, Saarstrasse 48, 7080 Aalen, both of Fed. Rep. of Germany

[21] Appl. No.: 84,585

[22] Filed: Oct. 15, 1979

[30] Foreign Application Priority Data

Oct. 26, 1978 [DE] Fed. Rep. of Germany ....... 2846909

[51] Int. Cl.³ ............................................ B60C 27/00
[52] U.S. Cl. ................... 152/220; 152/222; 152/224
[58] Field of Search ................ 152/224, 223, 225 R, 152/220–222, 171, 172, 189

[56] References Cited

U.S. PATENT DOCUMENTS

| | | | |
|---|---|---|---|
| 1,114,983 | 10/1914 | Grisingher | 152/224 |
| 1,342,753 | 6/1920 | McGeorge | 152/221 UX |
| 1,395,057 | 10/1921 | Nelson | 152/224 X |
| 1,459,091 | 6/1923 | Dougherty | 152/224 |
| 2,183,321 | 12/1939 | Jackson | 152/222 |
| 2,330,839 | 10/1943 | O'Brien | 152/225 R |
| 2,998,043 | 8/1961 | Patrick et al. | 152/220 |

*Primary Examiner*—Wiliam A. Powell
*Assistant Examiner*—Thomas Bokan
*Attorney, Agent, or Firm*—Parmelee, Johnson, Bollinger & Bramblett

[57] ABSTRACT

In a tire chain comprising supporting members (1) disposed on the tread surface a retaining network (4) for the supporting members (1) is used which comprises transversely extending network parts (3) connecting lateral strands (6) and passing through passage apertures (2) in the supporting members (1). To prevent tilting of the supporting members (1) about their longitudinal axis the transversely extending network parts (3) are joined together in the region of the tire tread by connecting strands (11) which form holding-down means for the longitudinal edges of the supporting members (1).

18 Claims, 9 Drawing Figures

Fig.3
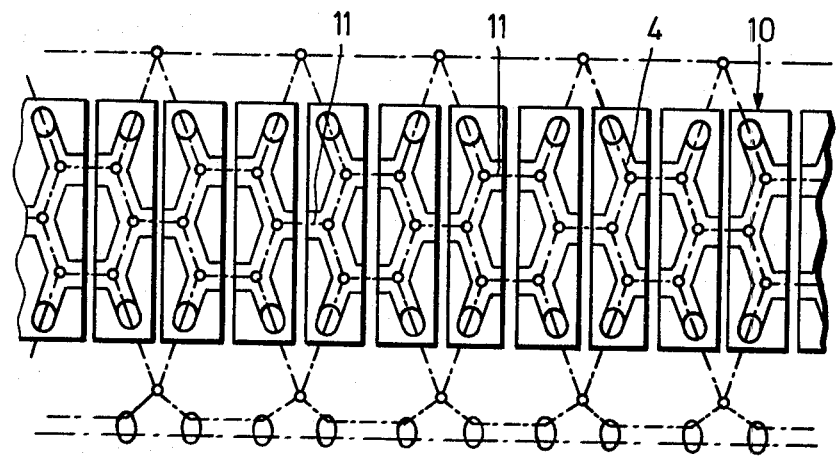
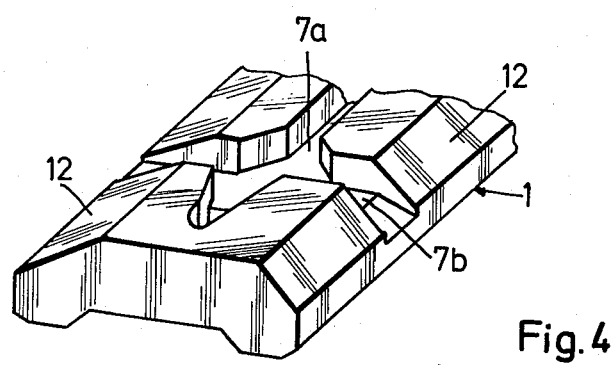
Fig.4

TIRE CHAIN

The invention relates to a tire chain comprising supporting members which are disposed on the tread surface of the tire and which are held by a retaining network comprising lateral strands and transversely extending network parts, the latter being passed through passage apertures in the supporting members for the purpose of securely joining the supporting members to the retaining network and, between the passage apertures, extending over the outer side, facing the roadway, of the supporting members.

From U.S. Pat. No. 1,459,091 a chain of the above-described type is known, in which the retaining network is formed by a ladder chain whose transverse strands, following one another with relatively wide spacing, hold supporting members.

In the known tire chain the supporting members serve only as intermediate layer, protecting the tire, between the transverse strands and the tire tread. They are slightly curved outwards in order to form hollows for the transverse strands. The shape and the securing of the supporting members by only one transverse strand in each case entail the disadvantage that they readily tend to tilt about the longitudinal axis of the transverse strand, so that the roadway may be damaged.

The tendency of the supporting members to tilt or swing is also found disturbing in another tire chain, which is known from DE-PS No. 1,289,446. This tire chain is in the form of a plate chain in which the lower faces of the plates, which form supporting members serving to enlarge the tread surface of the tire, are joined to a retaining network by means of short lengths of chain strands. In this case it is an additional disadvantage that the tire is stressed relatively heavily because the plates form rigid abutments for the chain links situated between them and the tread of the tire. Moreover the fastening arrangement for the plates is expensive, and the fastening elements used are likewise heavily loaded.

It is the object of the invention to provide a tire chain of the kind initially described which, while of simple construction and not subjecting either the tire or the roadway to rough treatment, has a retaining network preventing the swinging or tilting of the supporting members about their longitudinal axis, thus ensuring advantageous conditions of contact between the supporting members and the tire on the one hand, and between the supporting members and the roadway on the other hand.

According to the invention this object is achieved in that the transversely extending network parts, which are associated with neighbouring supporting members serving to enlarge the tread surface of the tire, are joined together in the region of the tire tread by connecting strands which form holding-down means for the longitudinal edges of the supporting members.

The tire chain according to the invention makes it possible for the ground contact area of the tire to be enlarged and, through the chain network parts disposed outside the supporting members, to increase the grip of the tire without excessively stressing the roadway or the tire. Since the supporting members are so-to-speak held in a chain cage, they cannot become erected and a spade or digging effect is prevented. No special connecting members—which in addition would be highly loaded—are required for connecting the supporting members to the carrying network. During the mounting of the chain the passage apertures permit restricted relative movements between the supporting elements and the carrying network. The tire chain is easy to produce and requires no maintenance. Because of the type of fastening selected for the supporting members, the latter can be comparatively narrow; this has an advantageous effect on contact conditions both in the road contact region of the tire and between the supporting members and the tire itself.

Further details and features of the tire chain according to the invention will be seen from the sub-claims and from the following description of a number of embodiments illustrated as examples in the accompanying drawings, in which:

FIG. 3 is a plan view of part of a second tire chain, shown spread out;

FIG. 4 is a partial view in perspective of a supporting member;

Figure 1:
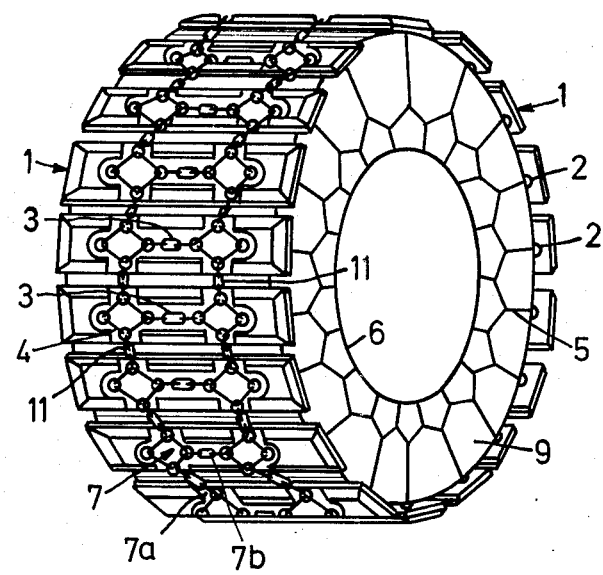
FIG. 1 is a view in perspective of a first tire chain.

In FIG. 1, 1 designates supporting members which are provided with passage apertures 2 for transversely extending network parts 3 of a retaining network 4, which by means of retaining network strand portions 5 are joined to lateral strands 6. On the outside of the supporting elements 1 are provided guide hollows 7, which serve to receive retaining network parts extending over the outside of the supporting members 1. The guide hollows 7 are provided with intercrossing portions 7a and 7b. In the crossing region are disposed retaining network strand portions forming quadrants.

The supporting members 1 are made of a flexible material, such as rubber or an elastic plastics material. Because of their elasticity the supporting members can yield when they roll over an obstacle, so that the overstressing of individual supporting members or of the tire contact surface is avoided. In order to limit the loading on an uneven roadway, the width $B_T$ of the supporting members 1 is about one-third greater than the width $B_L$ of the tread of the tire (see FIG. 2). Because of the relatively large number of supporting members distributed over the periphery of the tire, favourable angles of approach are obtained for the supporting members coming into contact with the ground one after the other. At the same time the self-cleaning action of the tire chain is improved and, despite the fact that a wandering movement can easily take place between the tire chain and the tire, there is no danger that the tire will turn in the tire chain, as is the case when fewer, large plates are used. On soft ground or a sand track a grid is obtained which increases the grip of the tire equipped with the tire chain.

Figure 2:
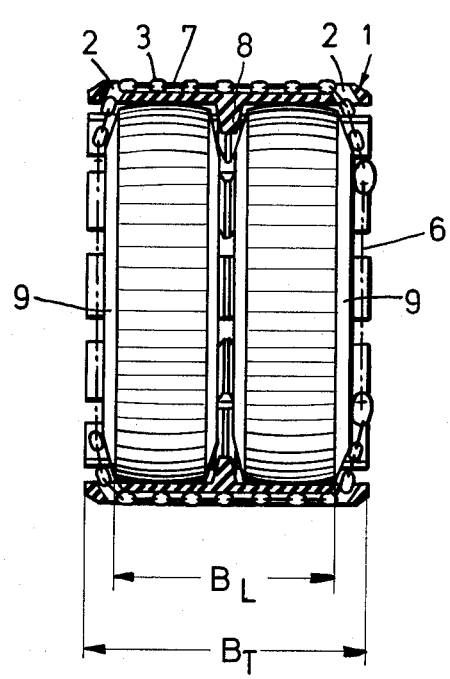
FIG. 2 shows, partly in section, a front view of a double tire equipped with a tire chain according to FIG. 1.

As FIG. 2 shows, when supporting members 1 are used for twin tires, it is expedient to provide guide beaks 8 which project into the gap between each two tires 9.

Both in the tire chain according to FIG. 1 and in that according to FIG. 3, the supporting members 1 and 10 respectively following one another in the peripheral direction of the tire are joined together by connecting strands 11 of the retaining network 4. An arrangement of this kind improves the resistance to tilting of the supporting members.

FIG. 4 shows on a larger scale a part of a supporting member having intercrossing guide hollows 7a and 7b and largely corresponding to the supporting member 1 of FIG. 1, so that this member is given the same reference number.

The inclined surfaces designated 12 improve the entry of the supporting members 1 into the region of the ground contact surface of the tire. While the supporting members as a whole are still at an angle to the ground contact surface, they already form supporting surfaces extending parallel to the ground contact surface. However, not only is wheel entry improved, but in addition a desirable compaction of the ground is achieved on soft ground.

Figure 5:
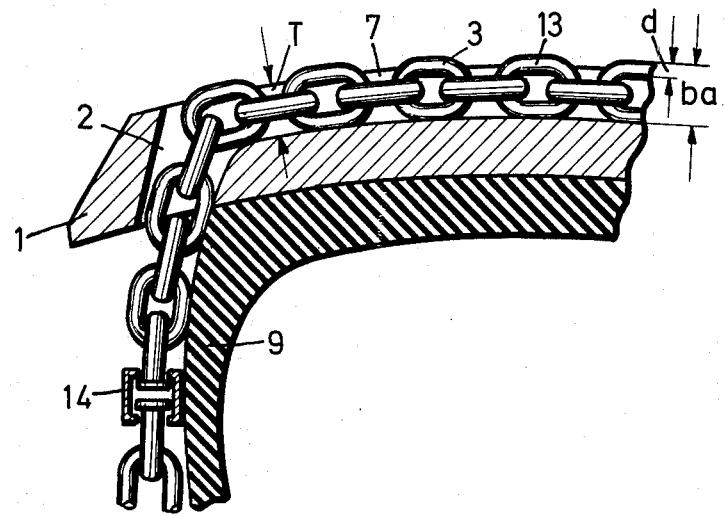
FIG. 5 shows the connection of a transversely extending network part to lateral retaining network portions by means of a chain connector.

In the embodiment illustrated in FIG. 5 the depth T of the guide hollow 7 is smaller than the outside width $b_a$ of chain links which form the retaining network, and greater than the double link wire diameter d of the chain links 13. Through suitable selection of the depth T it is possible to take into account varying requirements in respect of protection of the roadway and grip. 14 is a chain connector which permits ready replacement of the supporting member.

Figure 6:
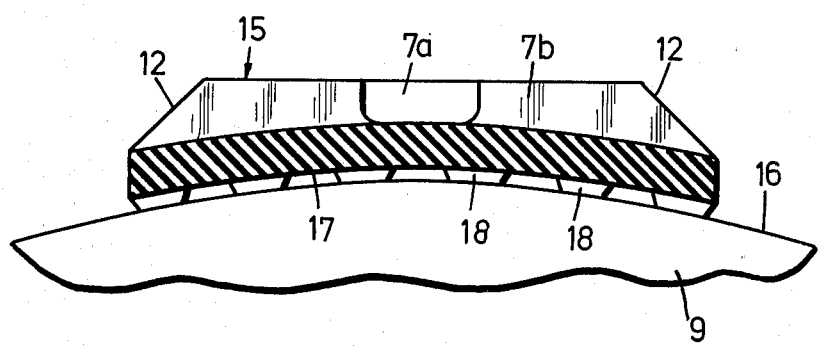
FIG. 6 shows a supporting member which is supported by means of retaining members on the tread of a tire, and which is made of a flexible material.

FIG. 6 shows a supporting member 15 of rubber or plastics material, which on its lower face 17 facing the tread 16 of the tire is provided with retaining members 18, which counteract a relative movement between tire and tire chain.

Figure 7:
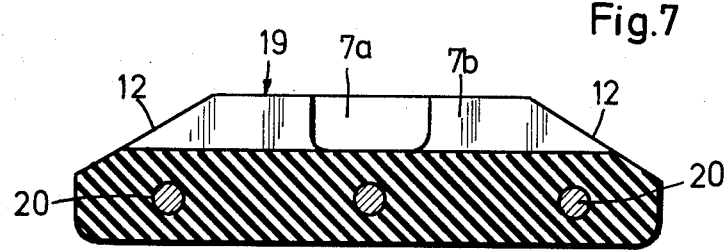
FIG. 7 shows a supporting member of modified construction, with reinforcing inserts.

The supporting member 19 in FIG. 7 is likewise made of rubber or plastics material, but is provided with reinforcing inserts 20.

Figure 8:
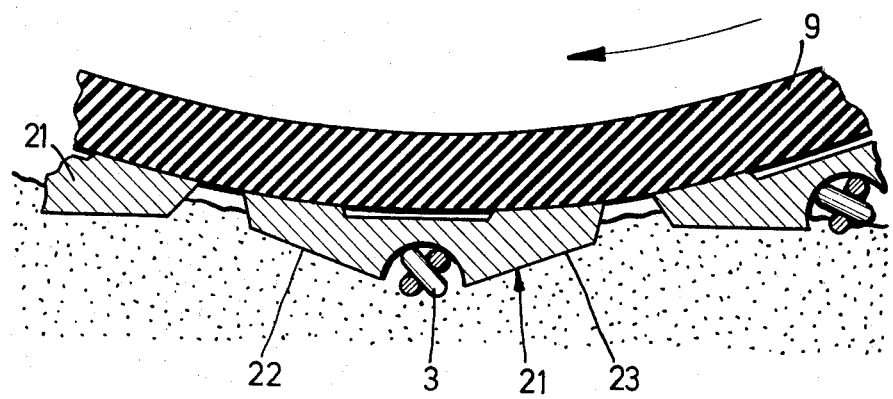
FIG. 8 shows a supporting member having a particularly advantageously shaped outer surface.

FIG. 8 shows in section supporting members 21 which have roof-shaped outer surfaces 22 and 23 which, viewed in the running direction, extend obliquely to the contact surface of the tire. Through the inclined arrangement, wheel entry is here again facilitated.

Figure 9:
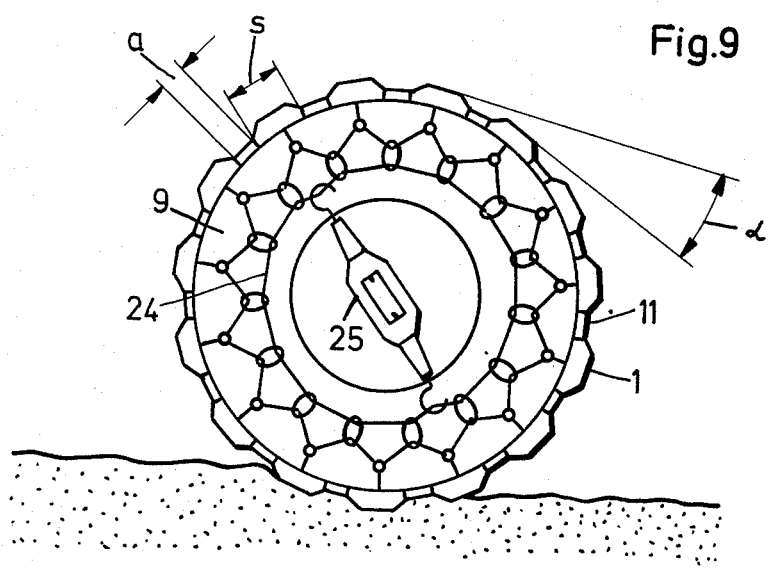
FIG. 9 is a side view of another tire chain.

FIG. 9 is a side view of a tire chain whose supporting members are once again given the reference number 1. From this Figure it can be seen that the distance a between successive supporting members 1 is approximately equal to one third of the dimension s of the supporting members 1 in the running direction. The number of supporting members 1 should be between 12 and 30 depending on the size of the wheel, and should be so great that in the region of the ground contact surface at least three supporting members are in action at any one time. For the angle α values between 10° and 35° are then obtained. A solution comprising 20 supporting members and with an angle α of the order of 18° has been found particularly advantageous. FIG. 9 also shows the ability of the retaining network to be tensioned with the aid of a lateral chain 24 and of a tensioning device 25. Through the use of a continuous, one-piece retaining network the tire chain can as a whole be very satisfactorily adapted to the shape of a pneumatic tire, particularly when radial tires, which bulge out laterally to a considerable extent, are used.

We claim:

1. A tire chain comprising supporting members which are disposed on the tread surface of the tire and which are held by a retaining network comprising lateral strands and transversely extending network parts, said transversely extending network parts being passed through passage apertures in the supporting members for the purpose of securely joining the supporting members to the retaining network and, between the passage apertures, said transversely extending network parts extending over the outer side of the supporting members facing the roadway, characterized in that said transversely extending network parts (3) are joined together in the region of the tire tread (16) by connecting strands (11) which as well as the transversely extending network parts (3) are guides in guide hollows (7,7a, 7b) provided in the supporting members (1, 10, 15, 19 and 21) and which form holding-down means for the longitudinal edges of the supporting members (1, 10, 15, 19 and 21) which are formed from flexible material and serve to enlarge the tread surface of the tire, the number of said supporting members in the region of the ground contact surface of the tire being sufficiently large such that at least three of said supporting members are in action at any one time.

2. A tire chain according to claim 1, characterised in that the transversely extending network part (3) of each supporting member (1) is connected by at least two connecting strands (11) to the transversely extending network part (3) of the respective neighboring supporting member (1).

3. A tire chain according to claims 1 or 2, characterised in that the distance (a) between the successive supporting members (1,10) is approximately equal to one third of the dimension (s) of the supporting members in the running direction.

4. A tire chain according to claims 1 or 2, characterised in that the angle (α) between the tangents to the apex points of two successive supporting members amounts to from 10° to 35°.

5. A tire chain according to claims 1 or 2, characterised in that the angle (α) between the tangents to the apex points of two successive supporting members amounts to from 15° to 25°.

6. A tire chain according to claims 1 or 2, characterised in that the width ($B_T$) of the supporting members (1) is about one third greater than the width ($B_L$) of the tread.

7. A tire chain according to claims 1 or 2, characterised in that the distance between passage apertures (2) disposed at opposite ends of the supporting members (1, 10) corresponds to the width of the tread of the tire in such a manner that the retaining network strand portions passing out at the lower face of the supporting members come to bear against the side walls of the tire.

8. A tire chain according to claim 1 or 2, characterised in that the depth (T) of the guide hollows (7) is smaller than the outside width ($b_a$) of chain links (13) forming the transversely extending network parts (3) disposed on the outside of the supporting members (1).

9. A tire chain according to claim 8, characterised in that the depth (T) of the guide hollows (7) is greater than twice the link wire diameter (d) of the chain links (13) which are in the form of round-steel links.

10. A tire chain according to claim 2, characterised in that the supporting members (1) are provided on their outer side with intercrossing guide hollows (7a,7b) and that network parts forming quadrants are disposed in the crossing region (FIGS. 1 and 4).

11. A tire chain according to claims 1 or 2, characterised in that the supporting members (1,10,15,19,21) are in plate form.

12. A tire chain according to claim 11, characterised in that the supporting members (15) are provided on their lower face (17), facing the tread (16) of the tire, with retaining members (18) counteracting relative movements between tire and tire chain.

13. A tire chain according to claim 12, characterised in that the retaining members (18) are made of a flexible material.

14. A tire chain according to claim 1 or 2, characterised in that the supporting members are made of plastics material or rubber.

15. A tire chain according to claim 14, characterised in that the supporting members (19) are provided with reinforcing inserts (20).

16. A tire chain according to claims 1 or 2, characterised in that the outer surface of the supporting members (21) extends, viewed in the running direction, at least partly obliquely in relation to the contact surface of the tire.

17. A tire chain according to claims 1 or 2, characterised in that the retaining network is formed by a chain network.

18. A tire chain according to claim 17, characterised in that the network parts (3) disposed on the outside of the supporting members (1) are connected by chain connectors (14) to supporting network parts lying in the region of the side walls of the tire.

* * * * *